(12) United States Patent
Kouno

(10) Patent No.: US 6,840,102 B2
(45) Date of Patent: Jan. 11, 2005

(54) FLOW AMOUNT MEASURING APPARATUS

(75) Inventor: Yasushi Kouno, Nagoya (JP)

(73) Assignee: Denso Corporation (JP)

( * ) Notice: Subject to any disclaimer, the term of this patent is extended or adjusted under 35 U.S.C. 154(b) by 43 days.

(21) Appl. No.: 10/368,013

(22) Filed: Feb. 19, 2003

(65) Prior Publication Data
US 2003/0182999 A1 Oct. 2, 2003

(30) Foreign Application Priority Data

Feb. 19, 2002 (JP) .......................................... 2002-041425
Jan. 17, 2003 (JP) .......................................... 2003-010165

(51) Int. Cl.$^7$ ................................................ G01F 1/68
(52) U.S. Cl. ................................... 73/204.15; 73/204.26
(58) Field of Search ........................... 73/204.15, 204.26

(56) References Cited

U.S. PATENT DOCUMENTS 5,036,702 A * 8/1991 Akamatsu et al. ........ 73/204.15
5,122,756 A * 6/1992 Nelson ..................... 73/204.15
6,070,462 A   6/2000 Igarashi et al.

FOREIGN PATENT DOCUMENTS

| EP | 0995975 A1 | 4/2000 |
| JP | 60-119037 | 6/1985 |
| JP | 02-243965 | 9/1990 |
| JP | 5-312613 | 11/1993 |
| JP | 5-312616 | 11/1993 |
| JP | 9-243423 | 9/1997 |

* cited by examiner

Primary Examiner—Harshad Patel
(74) Attorney, Agent, or Firm—Nixon & Vanderhye PC

(57) ABSTRACT

The flow amount measuring apparatus has two detecting portions for generating signal indicative of flow amount respectively. The outputs of two detecting portions are subject to a differential amplification to obtain large output signal and low amplitude ratio. A plurality of resistors providing the detecting portion may be formed on a single substrate. The output characteristic of the flow amount measuring apparatus can be adjusted by adjusting the gain and the offset. The offset includes a temperature dependent first offset component and a constant second offset component. The first offset component varies in accordance with temperature of fluid so as to reduce temperature dependency of the output characteristic. As a result, it is possible to measure flow amount accurately.

18 Claims, 18 Drawing Sheets

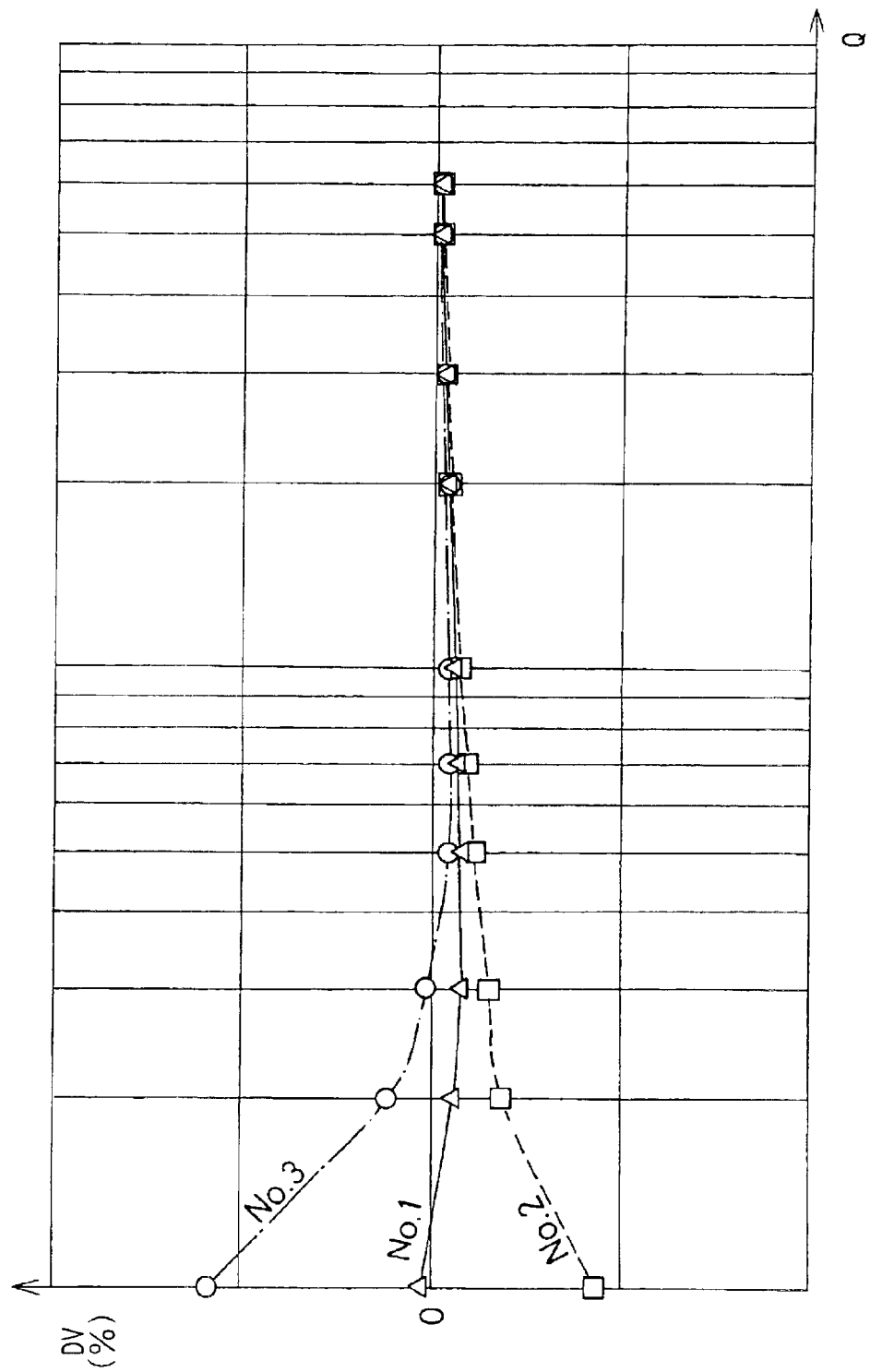

FLOW AMOUNT MEASURING APPARATUS

CROSS REFERENCE TO RELATED APPLICATIONS

This application is based on Japanese Patent Applications No. 2002-41425 filed on Feb. 19, 2002 and No. 2003-10165 filed on Jan. 17, 2003 the contents of which are incorporated herein by reference.

BACKGROUND OF THE INVENTION

1. Field of the Invention

The present invention relates to a flow amount measuring apparatus for measuring flow amount of fluid.

2. Description of Related Art

JP-A-2000-193505 discloses a flow amount measuring apparatus. The flow amount measuring apparatus has a temperature sensitive resistor that is disposed upstream a heating resistor. The temperature of the temperature sensitive resistor varies in accordance with flow amount of fluid and flow direction of fluid, and the temperature can be detected as resistance thereof. Therefore, the temperature sensitive resistor can detect both the flow amount of fluid and the flow direction of fluid.

According to this technique, the temperature of the temperature sensitive resistor varies within a small range. For this reason, it is required to enhance an amplitude ratio for amplifying detected voltage. On the other hand, in order to reduce difference of output characteristics between products, it is also required to adjust the amplitude ratio. However, output may be varied significantly in response to a very small amount of adjustment. Therefore, it was not easy to adjust the output.

JP-A-9-243423 discloses a flow amount measuring apparatus. The flow amount measuring apparatus has a first temperature sensitive resistor that is disposed upstream a heating resistor and a second temperature sensitive resistor that is disposed between the first temperature sensitive resistor and the heating resistor. According to this technique, it is possible to detect flow amount of fluid based on a difference between temperatures of the first temperature sensitive resistor and the second temperature sensitive resistor.

In this technique, it is also required to use great amplitude ratio. Therefore, it has the same disadvantages discussed above.

In addition, as a method for adjusting the amplitude ratio, a laser trimming method is available. In this method, resistance can be trimmed by applying laser beam directly onto a resistive layer formed on a chip. However, due to an expensive laser trimming machine, product price is also increased. Moreover, the laser trimming must be performed before attaching a cover and the like, that is, before completing a manufacturing of product. Therefore, the output characteristic may deviate during manufacturing process after the trimming process.

In addition, an electrical trimming method for electrically performing the trimming is also known. The electrical trimming method is effective if a temperature of fluid is constant. The output may be varied in response to change in the temperature of fluid. For example, in an airflow meter for detecting flow amount of intake air of a vehicular engine, the temperature of fluid varies frequently. For such purpose, the electrical trimming method has a disadvantage that it is not able to measure flow amount accurately.

SUMMARY OF THE INVENTION

Therefore, it is an object of the present invention to provide an improved flow amount measuring apparatus.

It is another object of the present invention to provide a flow amount measuring apparatus capable of utilizing an amplifier circuit with small amplitude ratio.

It is still another object of the present invention to provide a flow amount measuring apparatus capable of adjusting output easily.

It is yet another object of the present invention to provide a flow amount measuring apparatus capable of adjusting an amplitude ratio by externally applied electric signal.

It is yet still another object of the present invention to provide a flow amount measuring apparatus having an output characteristic with a reduced deviation derived from a temperature of fluid.

According to a first aspect of the present invention, a bridge circuit is utilized. The bridge circuit has a first temperature sensitive resistor and a second temperature sensitive resistor that are disposed in a diagonal fashion. A potential difference between two middle junction points in the bridge circuit is amplified and outputted.

According to this arrangement, when the potential level on one of the middle junction point in the bridge circuit is increased in accordance with a flow amount, the potential level on the other one of the middle junction points is decreased. Therefore, by applying a differential amplification on both the potential level on the middle junction points by an amplifier circuit, it is possible to achieve large output. As a result, it is possible to decrease the amplitude ratio of the amplifier circuit, that is, a gain.

In addition to the advantage above, or instead thereof, it is possible to adjust the output of the differential amplification to substantially 0 volt when the flow amount is 0. As a result, it is possible to lower an adjusting accuracy required for obtaining a predetermined offset. Therefore, it is easy to adjust the output in manufacturing process.

According to another aspect of the present invention, an amplifier circuit of the flow amount measuring apparatus determines a total offset by summing a first offset responsive to a temperature of fluid and a second offset unresponsive to the temperature of fluid. Moreover, it is adapted to make a ratio between the first offset and the second offset adjustable externally.

According to this arrangement, it is possible to adjust offset in accordance with the temperature of fluid. As a result, it is possible to achieve a stable output characteristic regardless of changing in the temperature of fluid. In addition, it is possible to perform the offset adjustment at less cost and in an easier manner. For example, it is possible to perform the adjustment so as to suppress a difference of the output characteristic of each product.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 23 is a graph showing deviation of output characteristic after adjusting by a comparative embodiment.

DETAILED DESCRIPTION OF PREFERRED EMBODIMENTS

Next, embodiments of the present invention will be explained with reference to the drawings.

First Embodiment

Figure 3:
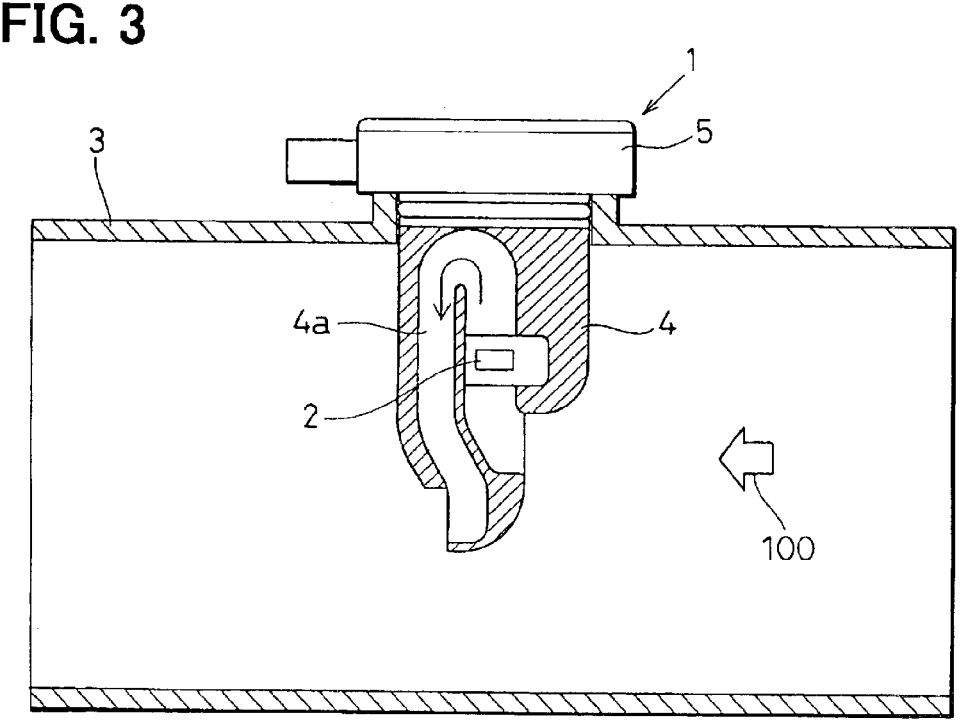
FIG. 3 is a cross-sectional view showing the airflow meter according to the first embodiment of the present invention.

In this embodiment, the flow amount measuring apparatus of the present invention is applied to an airflow meter 1 for measuring flow amount of intake air of internal combustion engine. As shown in FIG. 3, the airflow meter 1 is attached on an intake pipe 3 of the internal combustion engine. the airflow meter 1 has a sensor body 4 made of resinous material and a circuit unit 5. A sensor 2 is supported on the sensor body 4. An electric circuit is mounted on the circuit unit 5, and is electrically connected with the sensor 2 via signal lines, e.g., a printed circuit. The sensor body 4 is attached so as to protrude into the intake pipe 3. The sensor body 4 provides a substantially U shaped bypass passage 4a in which a part of intake air in the intake pipe 3 flows. The bypass passage 4a is a fluid passage through which air as fluid subject to measuring flows. The sensor 2 is located in the bypass passage 4a, and is exposed to air flowing there through.

Figure 2:
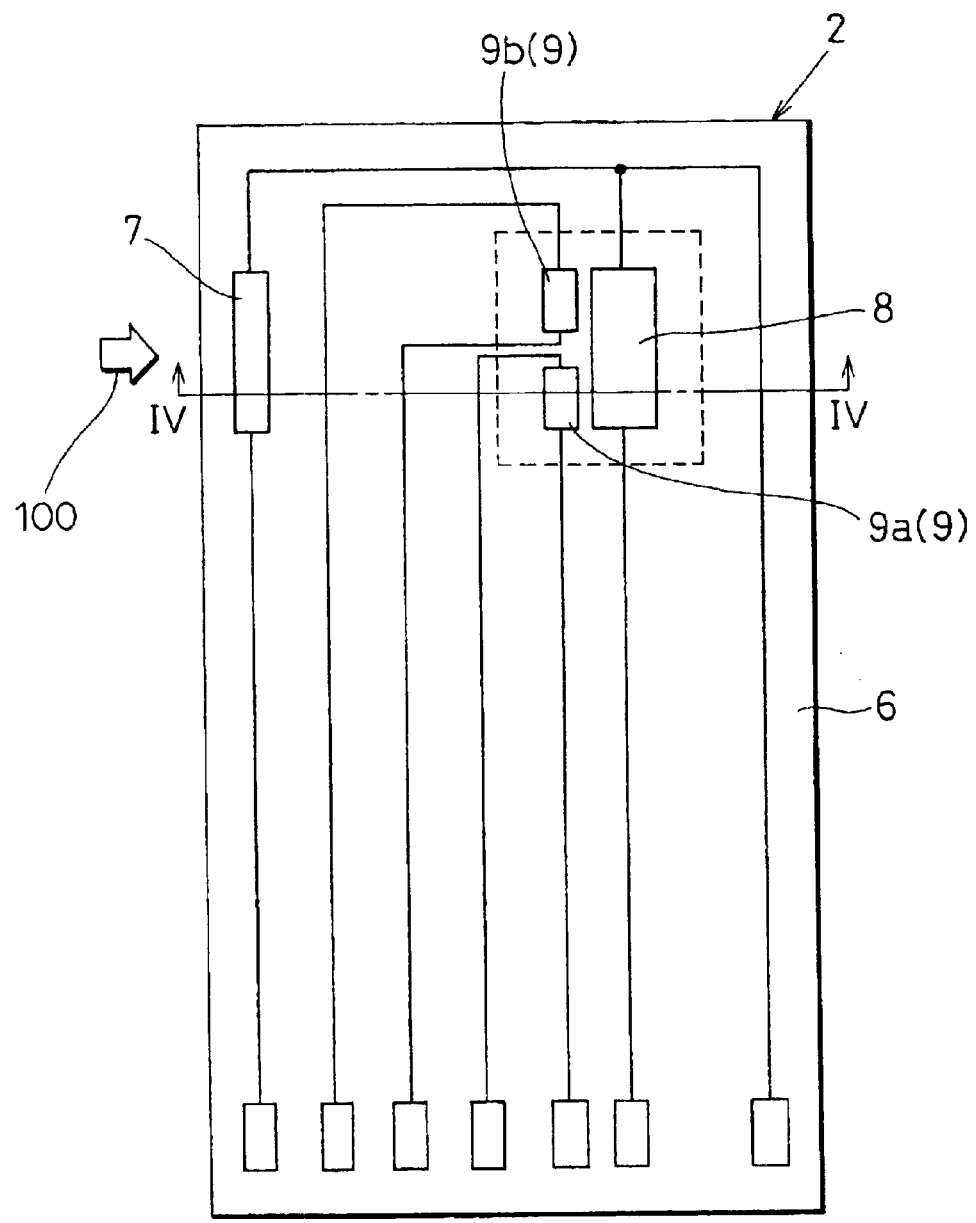
FIG. 2 is a plan view showing a sensor of the airflow meter according to the first embodiment of the present invention.

As shown in FIG. 2, the sensor 2 is a single sensor chip made of a substrate 6 on which a plurality of resistors is formed. The sensor 2 has a resistor 7 for detecting an intake air temperature. The resistor 7 may be referred to as an intake air temperature detecting resistor. The sensor 2 has a heating resistor 8 that is maintained higher in temperature by a predetermined temperature than the intake air temperature detected by the resistor 7. The sensor 2 has a resistor 9 disposed under thermal influence of heat from the heating resistor 8. The resistance of the resistor 9 varies in accordance with temperature. The resistor 9 may be referred to as a temperature sensitive resistor.

In this embodiment, the resistor 9 has a first resistor 9a and a second resistor 9b. Referring to FIG. 2, an arrow symbol 100 denotes a forward flow direction of intake air flowing toward the engine. The resistor 7 is located upstream the heating resistor 8. The first and second resistors 9a, 9b are located upstream the heating resistor 8 and adjacent to the heating resistor 8.

The resistor 7 is located on a place distanced by a predetermined distance from the heating resistor 8 in order to prevent thermal influence from the heating resistor 8. In addition, the first resistor 9a and the second resistor 9b are located on places on which the first resistor 9a and the second resistor 9b receive substantially equal amount of thermal influence from the heating resistor 8. For instance, the first resistor 9a and the second resistor 9b are located on the places in substantially equal distance from the heating resistor 8. The first resistor 9a and the second resistor 9b are formed with substantially equal surface area so that they show substantially equal change in resistance in accordance with temperature change of the heating resistor 8.

Alternatively, the temperature sensitive resistor 9 may be located downstream the heating resistor 8. The temperature sensitive resistor 9 may be provided by a resistor located upstream the heating resistor 8 and a resistor located downstream the heating resistor 8.

Figure 4A:
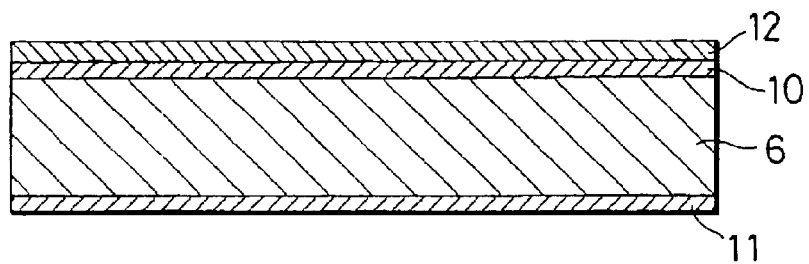
FIGS. 4A through 4D are cross-sectional views showing manufacturing steps of the sensor according to the first embodiment of the present invention.

A manufacturing process of the sensor 2 is illustrated in FIGS. 4A through 4D. Referring to FIG. 4A, in a first step, a base film 10 is formed on a surface of a Si substrate 6. The base film 10 is made of, for example, a double layered film combining a $Si_3N_4$ layer and a $SiO_2$ layer. The double layered film is advantageous for reducing stress on the base film 10 since it has a compression stress layer and a tension stress layer. A $Si_3N_4$ film 11 is formed on the backside surface of the Si substrate 6. In a second step, in order to form the resistors 7, 8, 9, a Pt film 12 is formed above the base film 10 via an adhesive film. The adhesive film is, for example, a Ti film of 50 Å (angstrom). The Pt film 12 has, for example, thickness of 2000 Å (angstrom). The Pt film is deposited under 200° C. by a vacuum depositing machine. For the material of the resistors, it is possible to use any materials capable of performing a resistor such as polysilicon, NiCr, TaN, SiC, W and Ti.

Figure 4B:
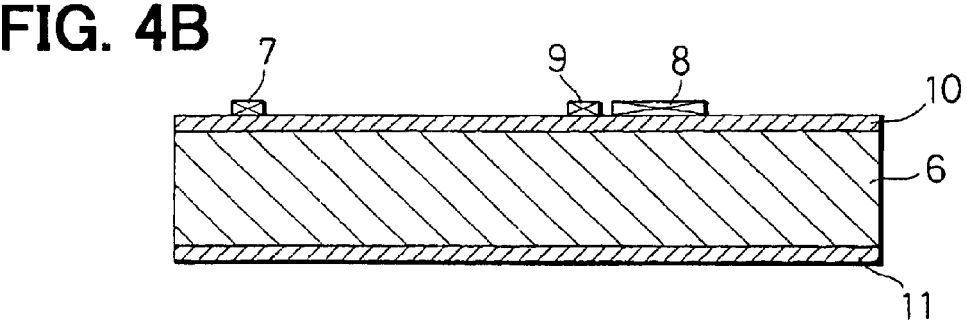

Referring to FIG. 4B, in a third step, the Pt film 12 formed on the base film 10 is processed by etching. By etching process, the resistors 7, 8, 9 having predetermined shape are formed respectively.

Figure 4C:
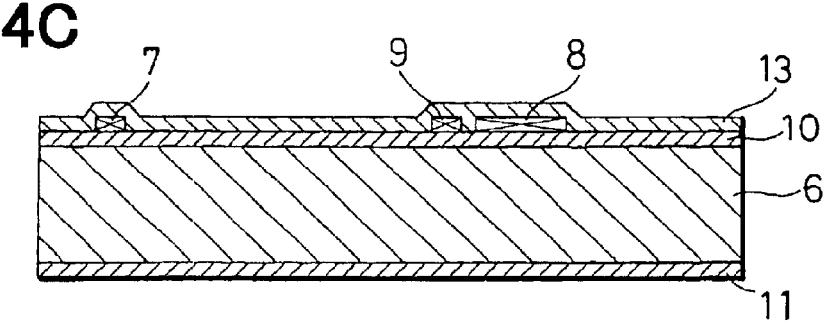

Referring to FIG. 4C, in a fourth step, a protective film 13 is formed on each of the resistors. The protective film 13 is a double layered film combining a $Si_3N_4$ layer and a $SiO_2$ layer similar to the base film 10. Alternatively, $TiO_2$, $Al_2O_3$, $Ta_2O_5$, and MgO film in a single layered or a multi layered fashion may be used as the protective film as long as it functions as the protective film.

Figure 4D:
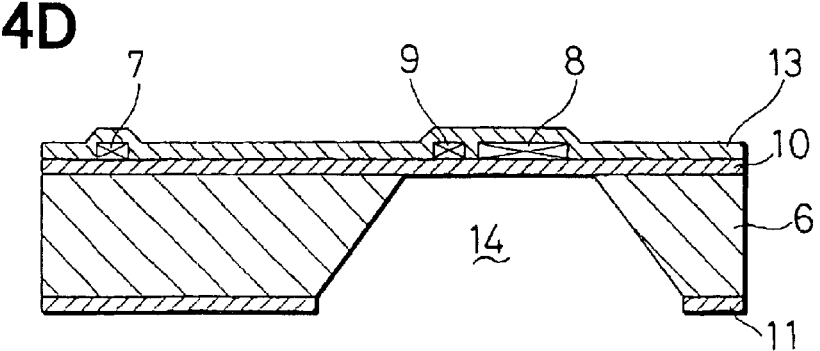

Referring to FIG. 4D, in a fifth step, a cavity 14 is formed on the Si substrate 6. The cavity 14 is formed over an area on which the heating resistor 8 and the resistor 9 are located. The corresponding area of the cavity 14 is illustrated by broken line in FIG. 2. For instance, the backside surface of the Si substrate 6 is exposed by removing a part of the $Si_3N_4$ film deposited on the backside of the Si substrate 6 by etching process, after that, the cavity 14 is formed by performing an anisotropic etching from the backside of the Si substrate 6 by using a TMAH solution. The etching in this step is not limited in the anisotropic etching using the TMAH solution. It is possible to use any method capable of forming the cavity 14.

Figure 1:
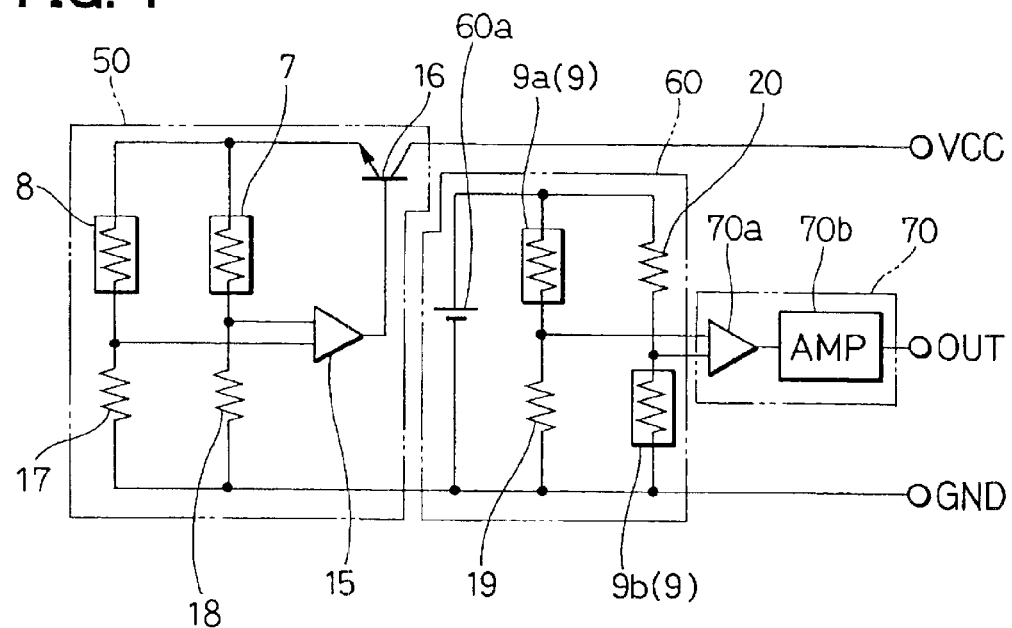
FIG. 1 is a circuit diagram of an airflow meter according to a first embodiment of the present invention.

FIG. 1 shows an electric circuit of the airflow meter 1. An electric circuit mounted in the circuit unit 5 and the resistors 7, 8, 9 on the sensor 2 constitute the circuit shown in FIG. 1. The circuit has a heater control circuit 50 for controlling a temperature of the hating resistor 8 at a target temperature that is higher than the intake air temperature detected by the resistor 7 by a predetermined temperature, e.g., 200° C. The circuit has an output circuit 60 for outputting voltage signal indicative of flow amount. The circuit has an amplifier circuit 70 for amplifying the output voltage of the output circuit 60.

The heater control circuit 50 has a bridge circuit that is provided by connecting four resistors. The bridge circuit may be referred to as a second bridge circuit. An operational amplifier 15 is connected between two middle junction points of the bridge circuit. The output of the operational amplifier 15 is connected to a transistor 16. In the bridge circuit, the heating resistor 8 and a first resistor 17 having fixed resistance are connected in series. The resistor 7 and a second resistor 18 having fixed resistance are connected in series. A connecting point between the heating resistor 8 and the resistor 7 is connected to a positive power terminal VCC via a transistor 16. A connecting point between the first and second resistors 17, 18 is connected to a ground terminal GND.

In case of that a temperature of the heating resistor 8 becomes lower than the predetermined temperature, a resistance of the heating resistor 8 is also decreased and a potential difference appears between the middle junction points of the bridge circuit. The operational amplifier 15 increases current passing through the transistor 16 in response to the potential difference. As a result, current flowing through the heating resistor 8 is increased, and a temperature of the heating resistor 8 is increased. After that, when a temperature of the heating resistor 8 rises to the predetermined temperature, the resistance also rises and potential difference between the middle junction points disappears. The operational amplifier 15 shut off or decrease current supply to the heating resistor 8 by the transistor 16 in response to the disappearance of potential difference. As a result, the heating resistor 8 is controlled at the target temperature higher than the intake air temperature by the predetermined temperature.

The output circuit 60 has a bridge circuit provided by the resistors 9a, 9b and fixed resistors 19, 20. The bridge circuit may be referred to as a first bridge circuit. The bridge circuit is constituted so that the first resistor 9a and the second resistor 9b are disposed on diagonally located arms. The resistor 19 is connected to a low voltage side of the first temperature sensitive resistor 9a. The resistor 20 is connected to a high voltage side of the second temperature sensitive resistor 9b. The resistors 19, 20 are the same in resistance. The bridge circuit is applied with constant voltage from a constant voltage circuit 60a. The bridge circuit has two middle junction points connected to the amplifier circuit 70.

The amplifier circuit 70 amplifies the potential difference between the middle junction points of the bridge circuit and outputs it to an engine control apparatus. The amplifier circuit 70 performs an amplification based on a gain and offsets. The amplifier circuit 70 may be constituted, for example, by a differential amplifier 70a and an output adjusting circuit 70b. The engine control apparatus has, for example, a correlative map between the output voltage OUT and a flow amount of intake air. The engine control apparatus detects the flow amount of intake air based on the output voltage OUT.

Figure 5:
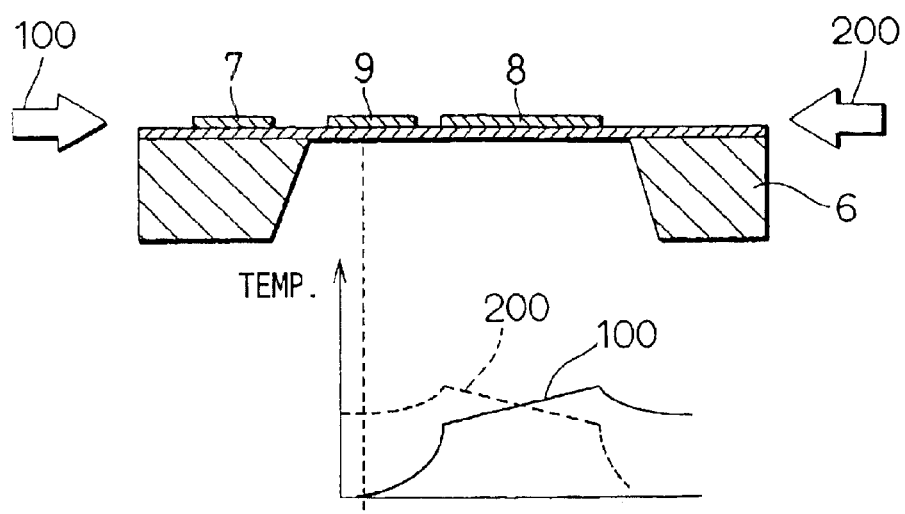
FIG. 5 is a graph showing temperature distribution of the sensor according to the first embodiment of the present invention.
Figure 6:
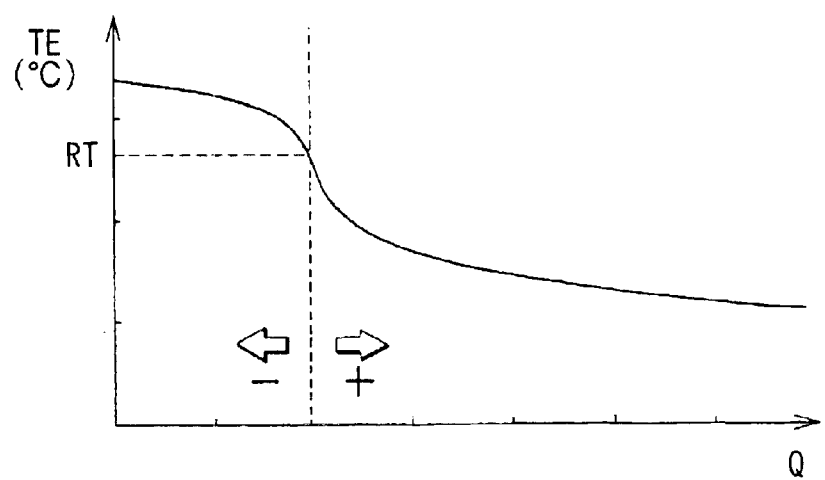
FIG. 6 is a graph showing relationship between flow amount and temperature according to the first embodiment of the present invention.

A relationship between a detected temperature of the resistor 9 and flow of intake air is explained based on FIG. 5 and FIG. 6. The heating resistor 8 is driven to and controlled at the target temperature that is higher than the intake air temperature by the predetermined temperature. Then, intake air flows in the intake pipe 3, the upstream side of the heating resistor 8 is cooled and temperature thereof is decreased. Simultaneously, the downstream side of the heating resistor 8 is increased in temperature. For example, the heating resistor 8 generates a temperature distribution as shown in FIG. 5. The temperature distribution demonstrates greater gradient as a flow amount is increased. In FIG. 5, a solid line shows a temperature distribution in case of the forward flow 100, a broken line shows a temperature distribution in case of the reverse flow 200.

The resistor 9 demonstrates similar change in temperature to the upstream side of the heating resistor 8. The detected temperature TE of the resistor 9 varies in accordance with both flow directions and the flow amount Q as shown in FIG. 6. The detected temperature under no flow, i.e., the flow amount Q=0, is referred to as a reference temperature RT. The detected temperature TE becomes lower than the reference temperature RT under the forward flow. The detected temperature TE becomes higher than the reference temperature RT under the reverse flow. A temperature difference between the detected temperature TE of the resistor 9 and the reference temperature RT is increased as the flow amount Q is increased regardless of flow directions of intake air. A symbol + denotes the forward flow 100, and a symbol − denotes the reverse flow 200 in FIG. 6.

Next, functions and advantages of the first embodiment are explained. The airflow meter 1 according to the embodiment disposes both the first resistor 9a and the second resistor 9b on a place upstream and adjacent to the heating resistor 8, and arranges the first and second resistors 9a, 9b on diagonally located arms in the bridge circuit. According to this arrangement, potential level on one of the middle junction point of the bridge circuit is increased as potential level on the other middle junction point is decreased, and contrary, potential level on one of the middle junction point of the bridge circuit is decreased as potential level on the other middle junction point is increased. Therefore, by performing a differential amplification on both potential levels on the middle junction points by the amplifier circuit 70, it is possible to achieve larger output than conventional flow amount measuring apparatus.

Figure 7:
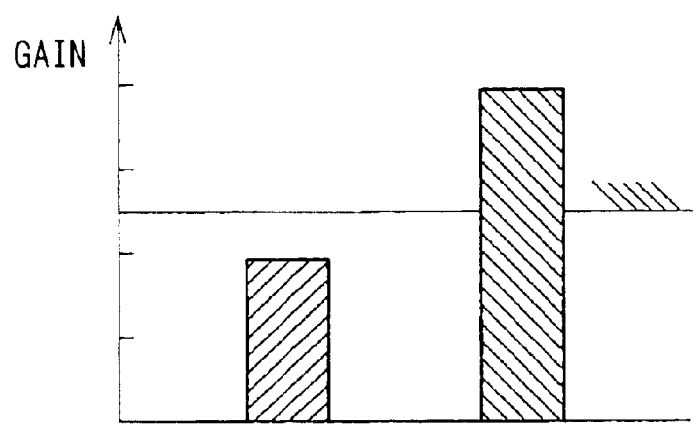
FIG. 7 is a graph showing an amplitude ratio of a circuit according to the first embodiment of the present invention.

In the embodiment, the first and second resistors 9a, 9b demonstrates substantially the same resistance in accordance with temperature change of the heating resistor 8, and the resistors 19, 20 have the same resistance. As a result, it is possible to obtain output in double compared with a comparative embodiment using a single resistor 9 for detecting temperature. Therefore, according to the embodiment, it is possible to decrease the gain of the amplifier circuit 70. For example, FIG. 7 shows the embodiment in the left part, and shows the comparative embodiment in the right part. As shown in FIG. 7, according to the first embodiment, the gain G for obtaining the same output can be decreased in half. As a result, it is possible to reduce influence of temperature characteristic, and to avoid significant change of output even the intake air temperature changed, therefore, it is possible to perform an accurate flow amount detection.

Figure 8:
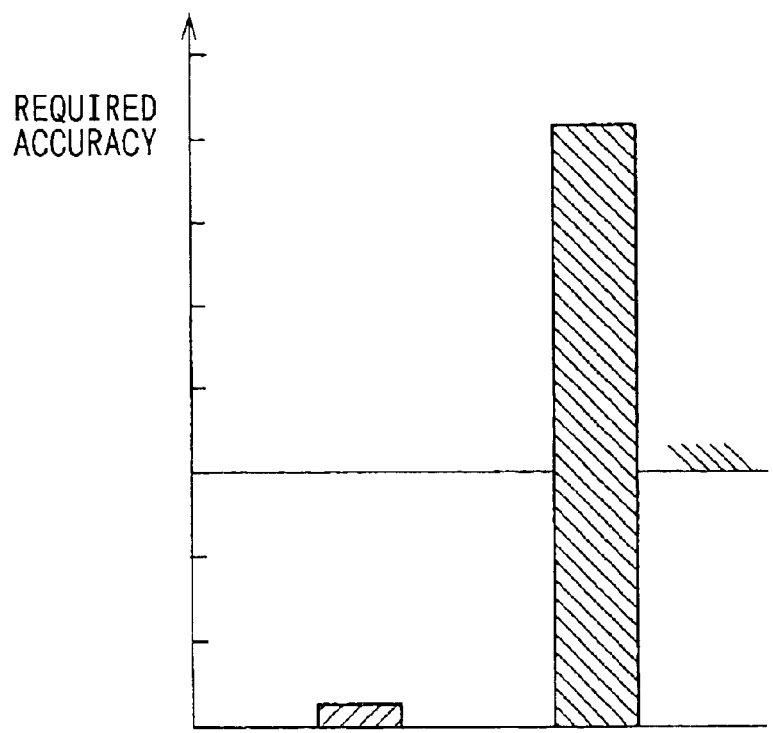
FIG. 8 is a graph showing accuracy required for adjustment according to the first embodiment of the present invention.

Since the amplifier circuit 70 amplifies potential difference between the middle junction points on the bridge circuit, it is possible to approach output voltage when no intake air flows to approximately 0 volt. As a result, it is possible to achieve a predetermined offset by performing relatively rough adjusting process. For example, in the first embodiment, it is possible to decrease an accuracy required to achieve the predetermined offset much less than that in the comparative embodiment. FIG. 8 shows accuracies required to obtain the predetermined offset, the left part showing the first embodiment, and the right part showing the comparative embodiment. As a result, in the first embodiment, it is easy to adjust the circuit.

Hereinafter, a plurality of embodiments implementing the present invention will be explained. The same or corresponding components already described in the first embodiment are indicated by the same reference numbers, and are not explained redundantly.

Second Embodiment

Figure 9:
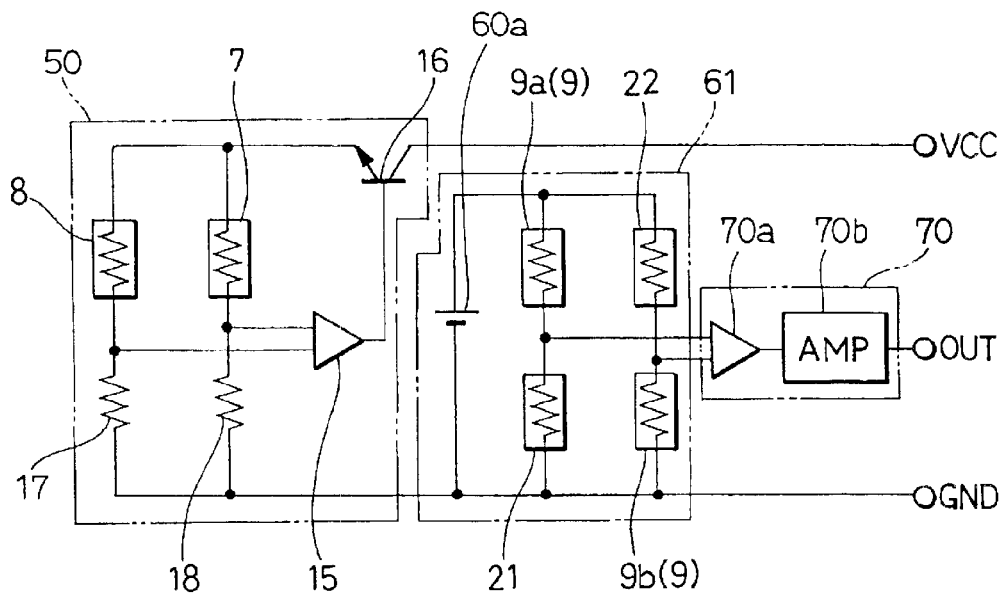
FIG. 9 is a circuit diagram of an airflow meter according to a second embodiment of the present invention.
Figure 10:
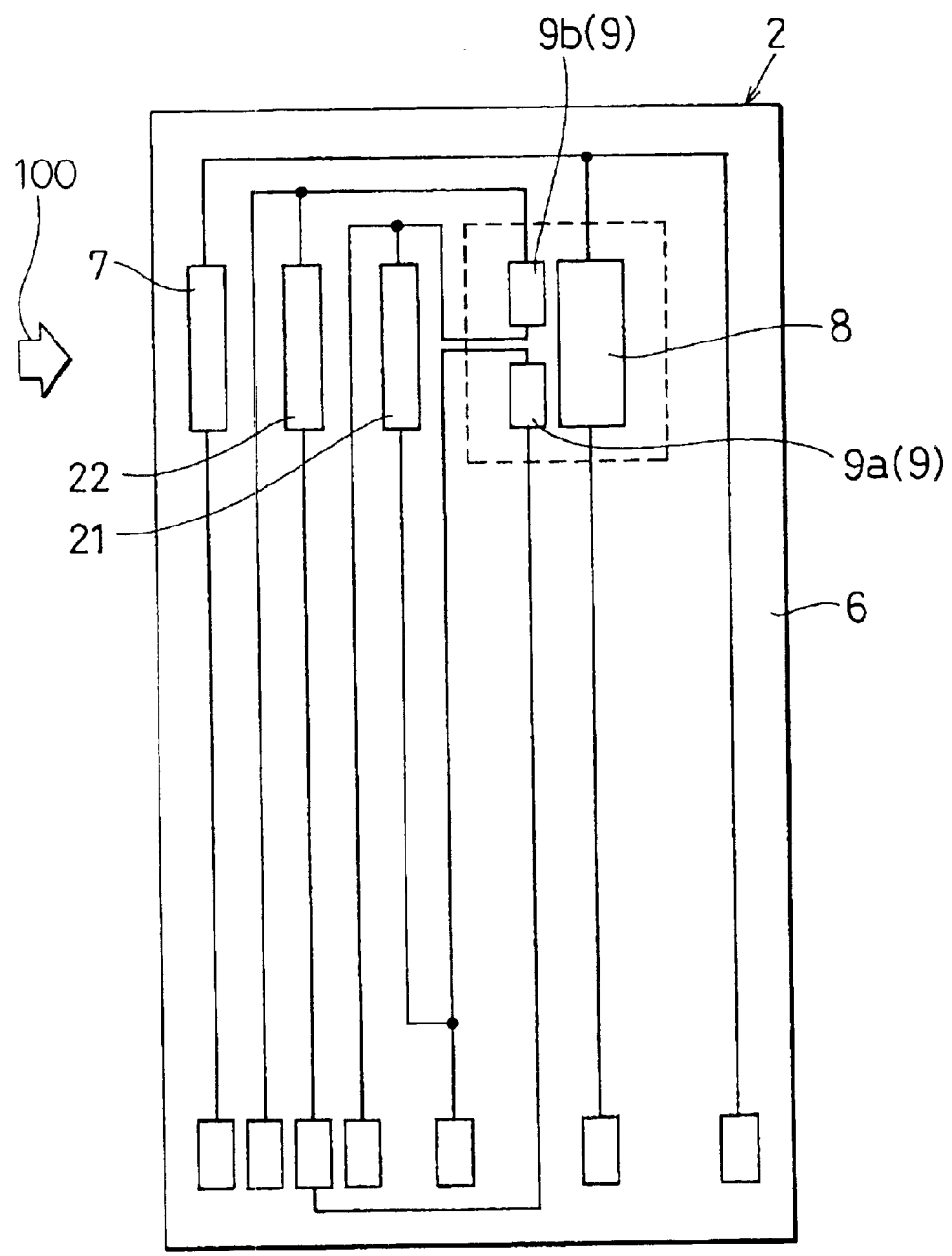
FIG. 10 is a plan view of a sensor according to the second embodiment of the present invention.

FIG. 9 and FIG. 10 shows a second embodiment of the present invention. In this embodiment, an output circuit 61 is utilized. The output circuit 61 uses resistors 21, 22 of which resistance varies in response to the intake air temperature instead of the resistors 19, 20 in the first embodiment. The first and second resistors 9a, 9b are influenced by not only heat of the heating resistor 8 but also the intake air temperature. Therefore, it is possible to compensate shift of the temperature characteristic by using two resistors 21, 22 of which resistance varies in accordance with the intake air temperature in the bridge circuit. As a result, it is possible to achieve a stable output even if the intake air temperature was changed. Two resistors 21, 22 are formed on the same substrate 6 on which the resistor 7, the heating resistor 8 and the resistor 9 are formed as shown in FIG. 10. According to the arrangement, it is possible to reduce variation of resistance.

Third Embodiment

Figure 11:
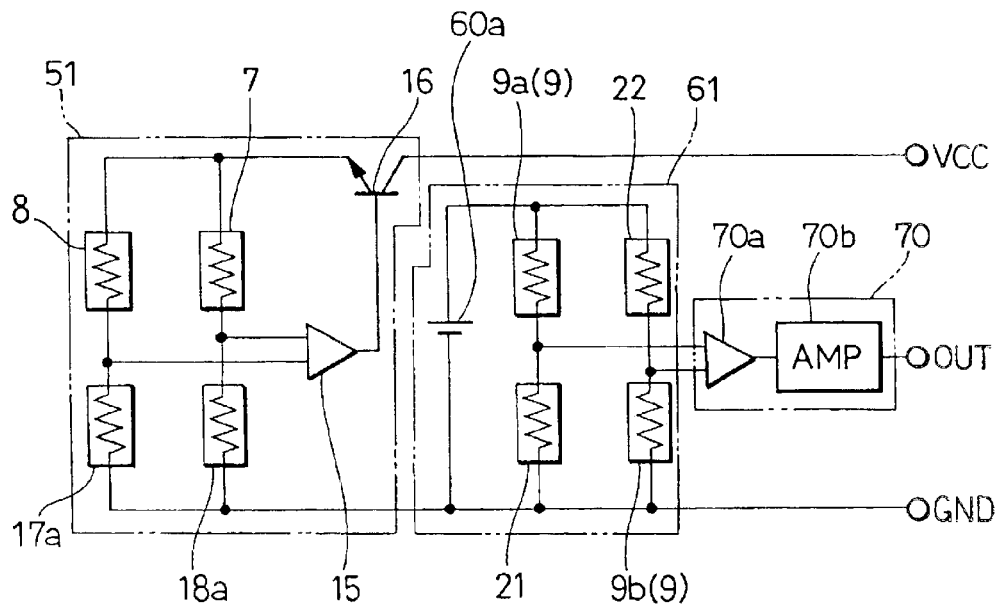
FIG. 11 is a circuit diagram of an airflow meter according to a third embodiment of the present invention.
Figure 12:
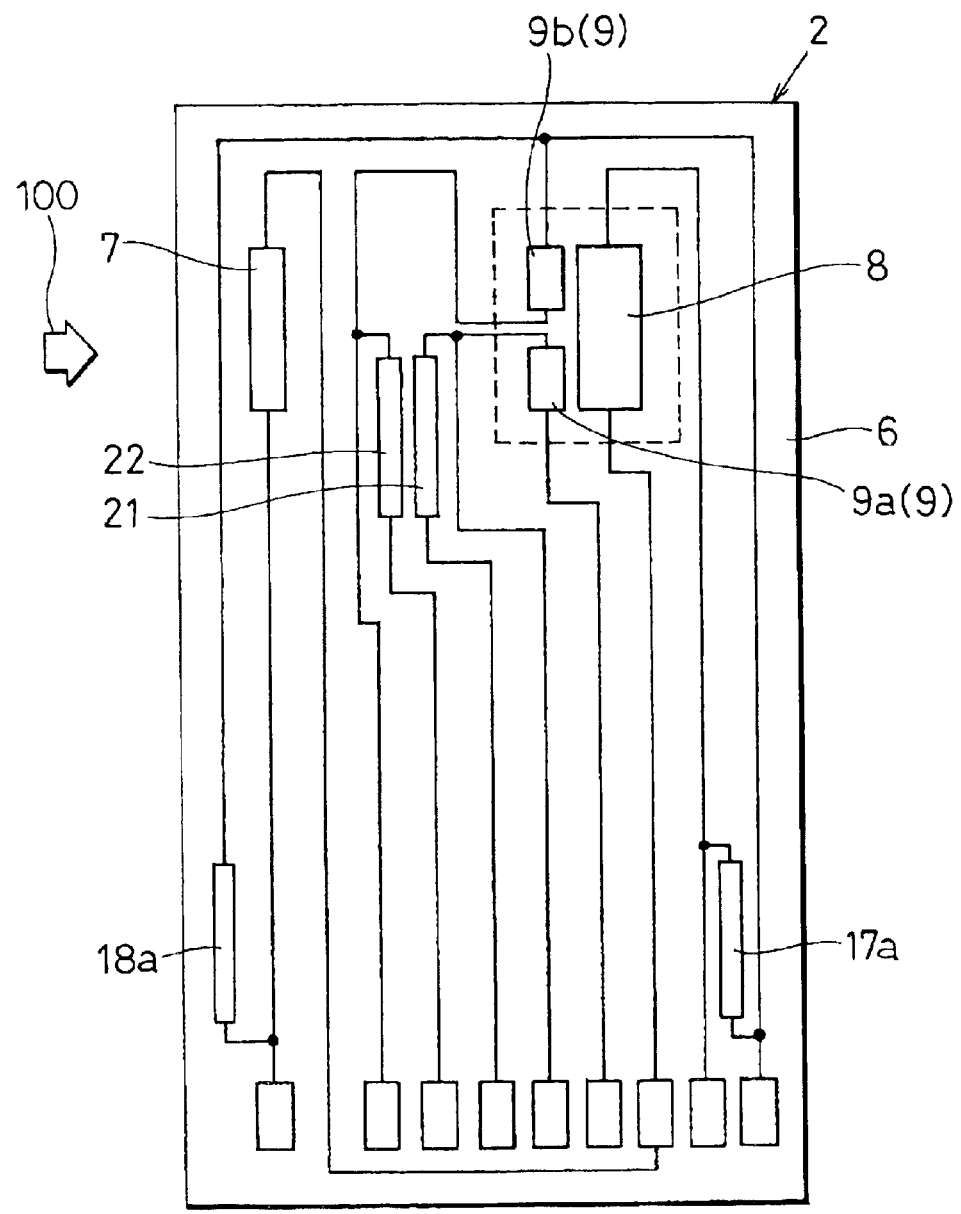
FIG. 12 is a plan view of a sensor according to the third embodiment of the present invention.

FIG. 11 and FIG. 12 show a third embodiment of the present invention. In this embodiment, a heater control circuit 51 is utilized. In the heater control circuit 51, resistors 17a, 18a are used instead of the resistors 17, 18 in the first embodiment. The resistors 17a, 18a are formed on the substrate 6. The resistors 17a, 18a are located on a place where an influence of the intake air temperature is hardly reached. The resistor 17a, 18a may be covered so as to not contact with the intake air. The first and second resistors 17a, 18a are formed on the same substrate 6 together with the resistor 7 and the heating resistor 8. Therefore, it is possible to reduce variation of resistance as small as possible. As a result, it is not needed to adjust resistance variation of each product. For example, it is possible to eliminate circuit adjusting process and resistance adjusting process by means such as the laser trimming.

Fourth Embodiment

Figure 13:
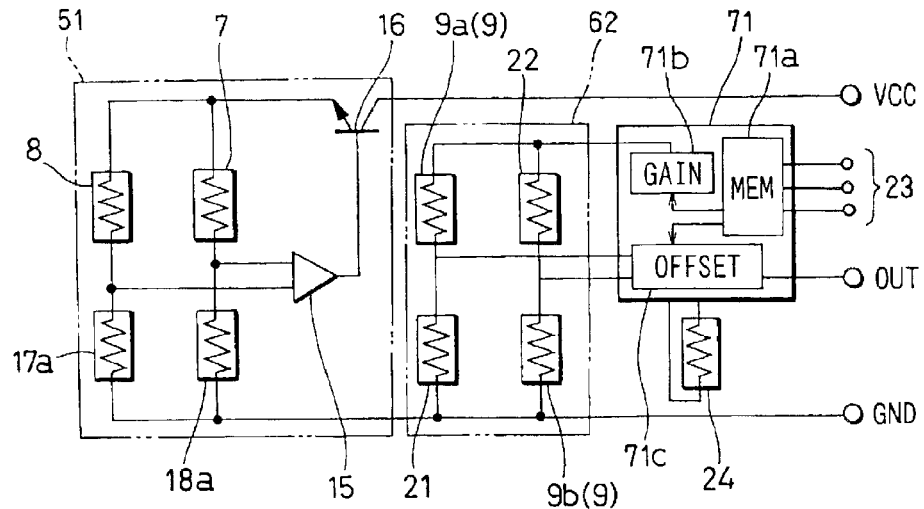
FIG. 13 is a circuit diagram of an airflow meter according to a fourth embodiment of the present invention.
Figure 14:
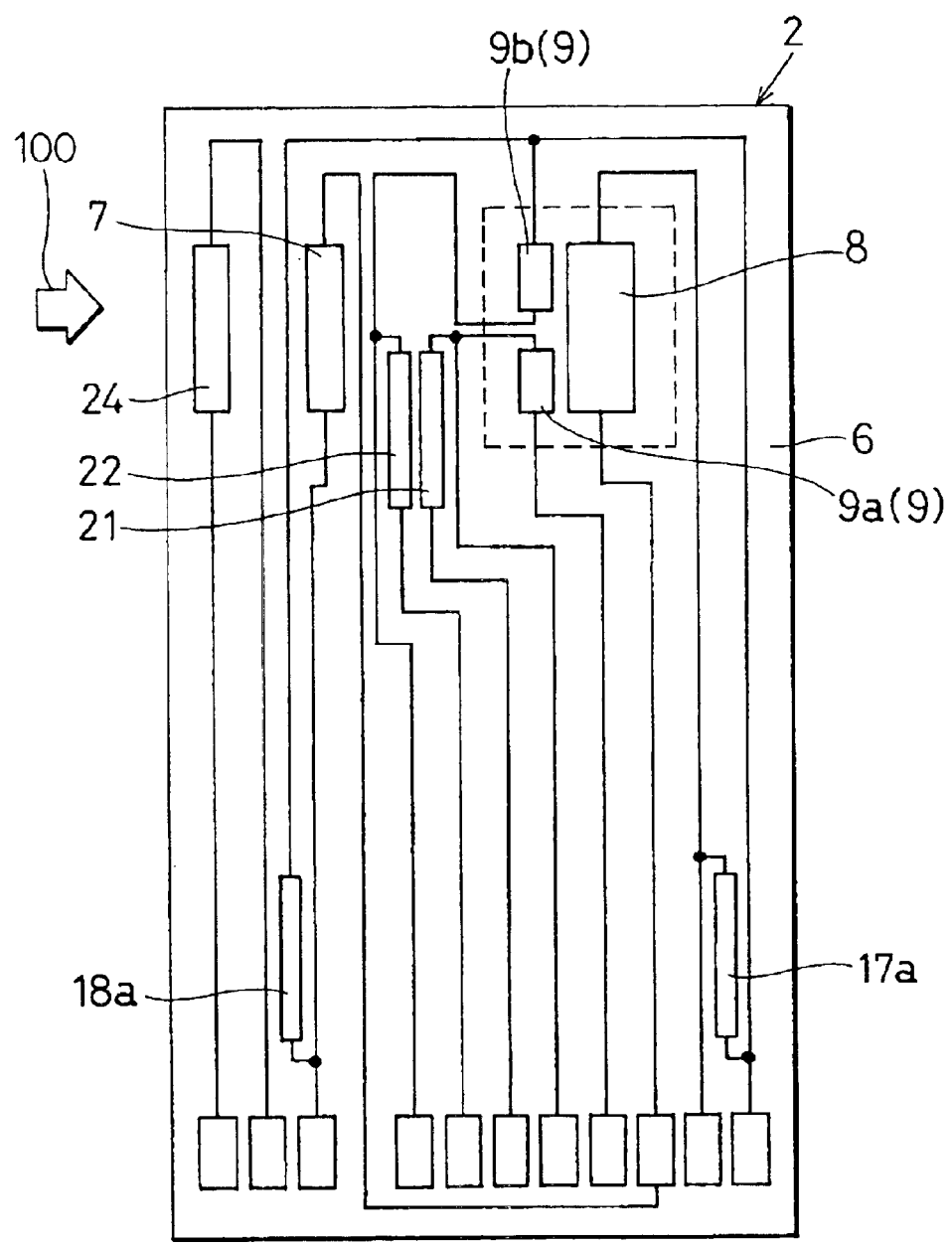
FIG. 14 is a plan view of a sensor according to the fourth embodiment of the present invention.

FIG. 13 and FIG. 14 show a fourth embodiment of the present invention. In this embodiment, an amplifier circuit 71 is utilized. An amplitude ratio of the amplifier circuit 71 is defined by gain and offset. The amplifier circuit 71 is constructed to enable the gain and the offset adjustable by the electrical trimming method. In the electrical trimming method, an external adjusting circuit is coupled with electrical trimming terminal 23 after the manufacturing of product is completed. The external adjusting circuit writes data into a memory device 71a such as a non-volatile memory mounted in the amplifier circuit 71 via the electrical trimming terminal 23. The amplifier circuit 71 adjusts the output based on the data stored in the memory device. The data includes the gain and the offset. For example, digital signal in serial form or analog signal may be used.

The amplifier circuit 71 has a gain setting circuit 71b for performing a gain adjusting function by varying voltage, i.e., gain voltage, applied to the temperature sensitive resistor 9. In addition, the amplifier circuit 71 has an offset setting circuit 71c for performing an offset adjusting function by varying offset voltage. The amplitude ratio is adjusted to the predetermined amplitude ratio by varying the gain voltage and the offset voltage based on the date stored in the memory device 71a. According to the electrical trimming method, since the amplitude ratio of the amplifier circuit 71 is adjusted by externally obtained electric signal, it does not need to use expensive laser trimming machine, it is possible to adjust the circuit at low cost and with ease.

However, according to the electrical trimming method of this embodiment, since the applied voltage to the temperature sensitive resistor 9 is varied at the gain adjustment, the temperature characteristic is changed, and output is also changed in accordance with the intake air temperature. In order to avoid this disadvantage, the amplifier circuit 71 of this embodiment varies the offset voltage in accordance with the intake air temperature.

The amplifier circuit 71 has a resistor 24 of which resistance is changed in accordance with the intake air temperature as shown in FIG. 13. The offset setting circuit 71c obtains the offset voltage including a first offset voltage which is changed in accordance with detected temperature of a resistor 24, and a second offset voltage which is constant. A ratio between the first offset voltage and the second offset voltage is adjustable. The resistor 24 is formed on the same substrate 6 together with the other resistors as shown in FIG. 14. As a result, the offset voltage obtains a characteristic depending upon the temperature. Therefore, it is possible to cancel an error components generated by the gain adjusting process by the offset adjusting process. As a result, even in the case that the amplitude ratio is adjusted by the electrical trimming method, the output is hardly changed in accordance with the intake air temperature, therefore, it is possible to perform accurate flow amount detection.

Alternatively, the amplifier circuit 71 explained in the fourth embodiment can be applied to the first through the third embodiments. The amplifier circuit 71 can be combined with an output circuit and a heater control circuit having different circuit configuration from the first through the third embodiments. For example, it is possible to apply to an apparatus that has a heating resistor, a temperature sensitive resistor located upstream and adjacent to the heating resistor, a temperature sensitive resistor located downstream and adjacent to the heating resistor, and a bridge circuit in which the temperature sensitive resistors are located on the neighboring positions.

Fifth Embodiment

Figure 15:
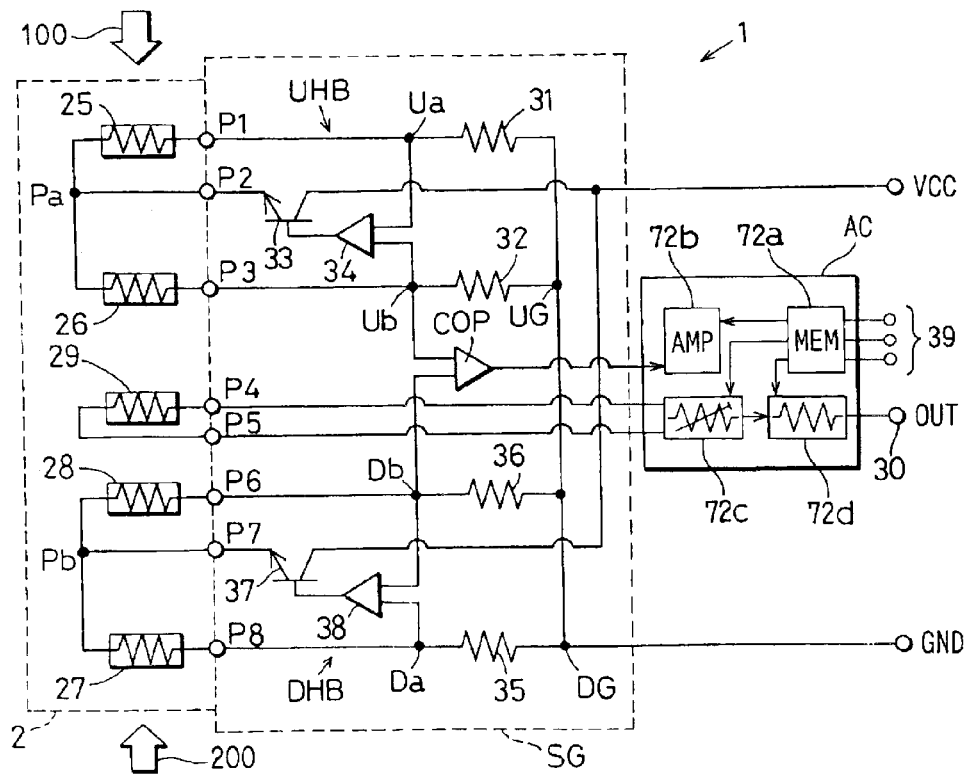
FIG. 15 is a circuit diagram of an airflow meter according to a fifth embodiment of the present invention.
Figure 16:
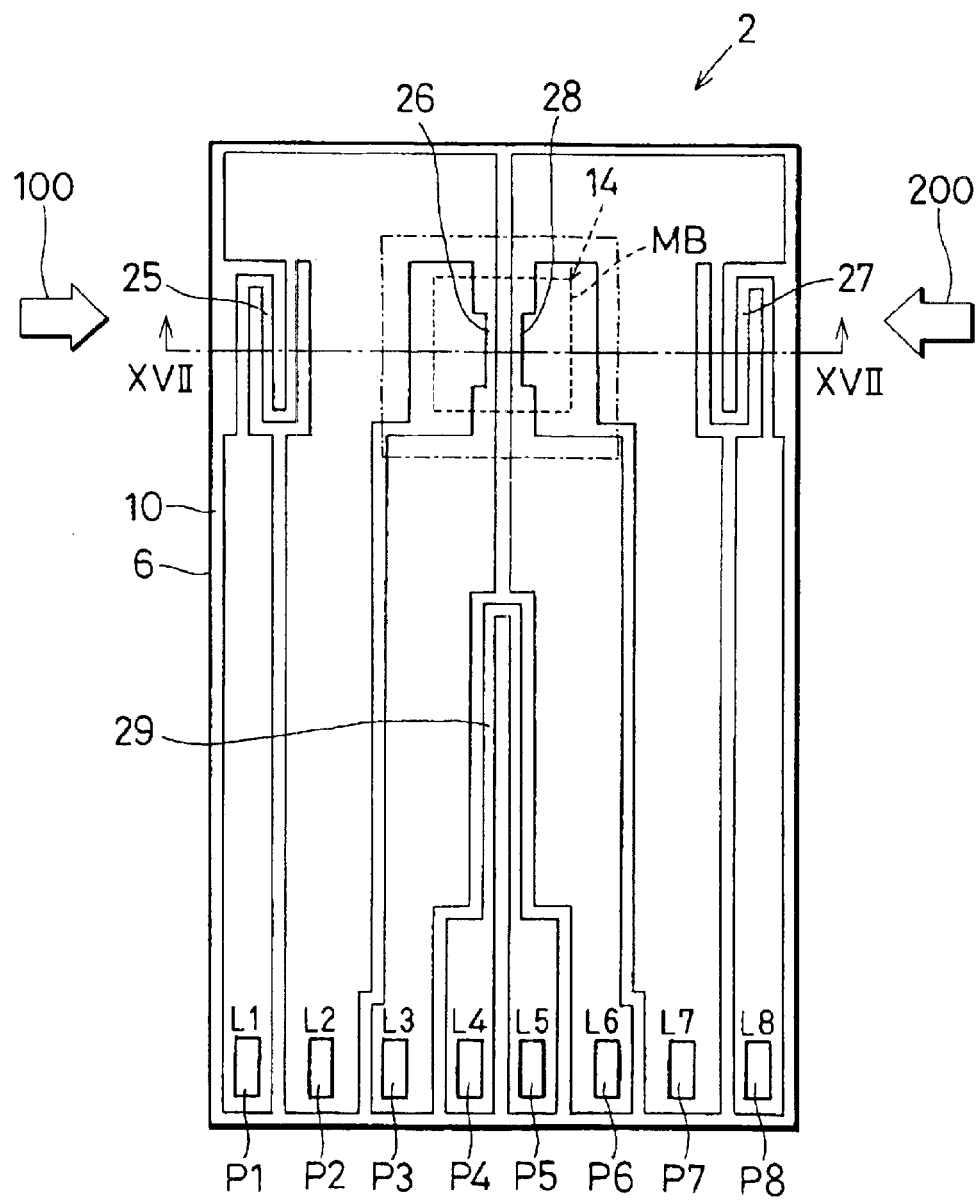
FIG. 16 is a plan view of a sensor according to the fifth embodiment of the present invention.

FIG. 15, FIG. 16, and FIG. 17 show a fifth embodiment. The fifth embodiment has a sensor 2 that outputs information indicative of flow amount of intake air and flow directions of intake air. As shown in FIG. 16, the sensor 2 has a substrate 6 made of single plate semiconductor such as Si. The substrate 6 has a plurality of resistors for functioning as a plurality of heaters and a plurality of temperature sensors on the surface.

An upstream heater 26 and upstream temperature sensor 25 both of which provide a first flow amount detecting portion are formed on the substrate 6. An downstream heater 28 and downstream temperature sensor 27 both of which provide a second flow amount detecting portion are formed on the substrate 6. A corrective temperature sensor 29 and lead portions L1–L8 are formed on the substrate 6. The lead portions L1–L8 have pad P1–P8 respectively for providing connecting terminals to the circuit unit 5.

Each of the upstream heater 26 and the downstream heater 28 is a resistor that generates heat in response to current supply. Simultaneously, each of the upstream temperature sensor 25 and the downstream temperature sensor 27 functions as a temperature sensitive member for detecting temperature itself based on variable coefficient between resistance and temperature. The upstream heater 26 and the downstream heater 28 are formed narrower than the lead portions L2, L3, L6, and L7.

Each of the upstream temperature sensor 25 and the downstream temperature sensor 27 is a resistor for detecting intake air temperature. The upstream temperature sensor 25 and the downstream temperature sensor 27 are located on positions distanced from the upstream heater 26 and the downstream heater 28 by predetermined distance so as to avoid thermal influence from the upstream heater 26 and the downstream heater 28. The upstream temperature sensor 25 and the downstream temperature sensor 27 are formed in a serpentine fashion in order to achieve predetermined length.

Figure 17A:
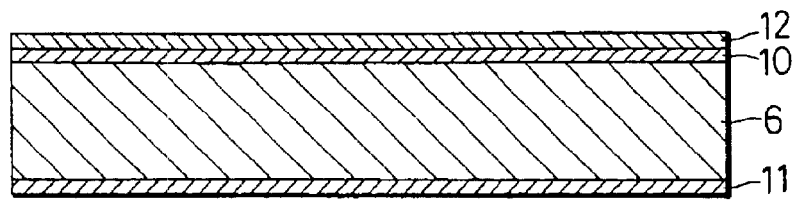
FIGS. 17A through 17D are cross-sectional views showing manufacturing steps of the sensor according to the fifth embodiment of the present invention.
Figure 17B:
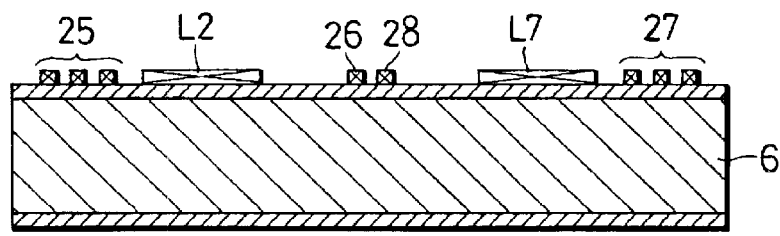
Figure 17C:
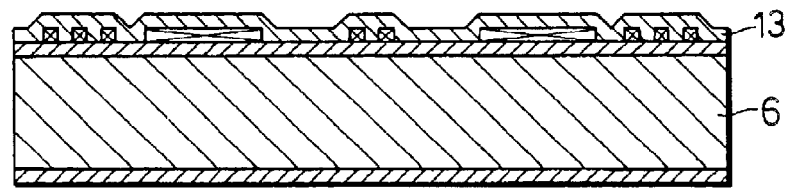
Figure 17D:
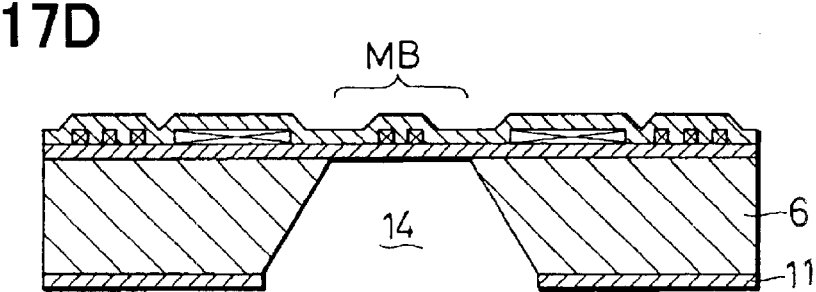

A manufacturing process of the sensor 2 is explained based on FIG. 17A–FIG. 17D. As shown in FIG. 17A, a first step and a second step are the same as in FIG. 4A of the first embodiment. In a third step, the upstream heater 26, the downstream heater 28, the upstream temperature sensor 25, the downstream temperature sensor 27, the corrective temperature sensor 29 and the lead portion L1–L8 are formed by an etching process as shown in FIG. 17B. In a fourth step shown in FIG. 17C, a protective film 13 is formed. In a fifth step shown in FIG. 17D, a cavity 14 is formed on the substrate 6. As a result of forming the cavity 14, a membrane portion MB is defined. The membrane portion MB is formed over an area on which the upstream heater 26 and the downstream heater 28 are formed. The membrane portion MB has smaller heat capacity, since it is thinner in thickness than the other portions of the sensor 2. In addition, the membrane portion MB provides thermal insulation. Therefore, the upstream heater 26 and the downstream heater 28 can demonstrate quick response in response to change of flow amount of intake air.

The circuit unit 5 has a signal generating circuit SG and an amplifier circuit AC as show in FIG. 15. The signal generating circuit SG generates electric signal, e.g., voltage signal, indicative of flow amount and flow direction on the basis of information detected by the sensor 2. The amplifier circuit AC amplifies the electric signal generated by the signal generating circuit SG. The electric signal amplified in the amplifier circuit AC is supplied to an engine control apparatus via an output terminal 30.

The signal generating circuit SG has an upstream bridge circuit UHB, a downstream bridge circuit DHB, and a differential amplifier circuit COP. The upstream bridge circuit UHB is Wheatstone bridge circuit. The downstream bridge circuit DHB is Wheatstone bridge circuit.

The upstream bridge circuit UHB is provided by the upstream heater 26, a resistor 32 connected in series with the upstream heater 26, the upstream temperature sensor 25, and a resistor 31 connected in series with the upstream temperature sensor 25. A junction point Pa between the upstream heater 26 and the upstream temperature sensor 25 is connected to the positive power terminal VCC via a transistor 33. A junction point UG between the resistor 31 and the resistor 32 is connected to the ground terminal GND. Both of two middle junction points Ua, Ub are connected to an operational amplifier 34. The operational amplifier 34 inputs a potential level on the middle junction point Ub defined by voltage drop on the upstream heater 26 and a potential level on the middle junction point Ua defined by voltage drop on the upstream temperature sensor 25. The operational amplifier 34 controls the transistor 33 so that the voltage drop on the upstream heater 26 and the voltage drop on the upstream temperature sensor 25 become equal. That is, the operational amplifier 34 controls the transistor 33 so as to obtain the balance requirement of the upstream bridge circuit UHB.

The upstream bridge circuit UHB is designed so that the temperature of the upstream heater 26 is higher than the intake air temperature detected by the upstream temperature sensor 25 by a predetermined temperature, e.g., 200° C. when the balance requirement is obtained. In addition, in order to obtain the balance requirement when the temperature of the upstream heater 26 is higher than the intake air temperature detected by the upstream temperature sensor 25 by a predetermined temperature, the upstream heater 26 and the upstream temperature sensor 25 are formed to have the same resistance-temperature coefficient.

The downstream bridge circuit DHB is provided by the downstream heater 28, a resistor 36 connected in series with the downstream heater 28, the downstream temperature sensor 27, and a resistor 35 connected in series with the downstream temperature sensor 27. A junction point Pb between the downstream heater 28 and the downstream temperature sensor 27 is connected to the positive power terminal VCC via a transistor 37. A junction point DG between the resistor 35 and the resistor 36 is connected to the ground terminal GND. Both of two middle junction points Da, Db are connected to an operational amplifier 38. The function of the operational amplifier 38 and the function of the downstream bridge circuit DHB are the same as the upstream bridge circuit.

The differential amplifier circuit COP inputs the potential level detected from the upstream bridge circuit UHB and the potential level detected from the downstream bridge circuit DHB, e.g., the potential level on the middle junction point Ub and the potential level on the middle junction point Db. The differential amplifier circuit COP generates signal corresponding to the potential difference between the potential level on the middle junction point Ub and the potential level on the middle junction point Db.

Figure 18:
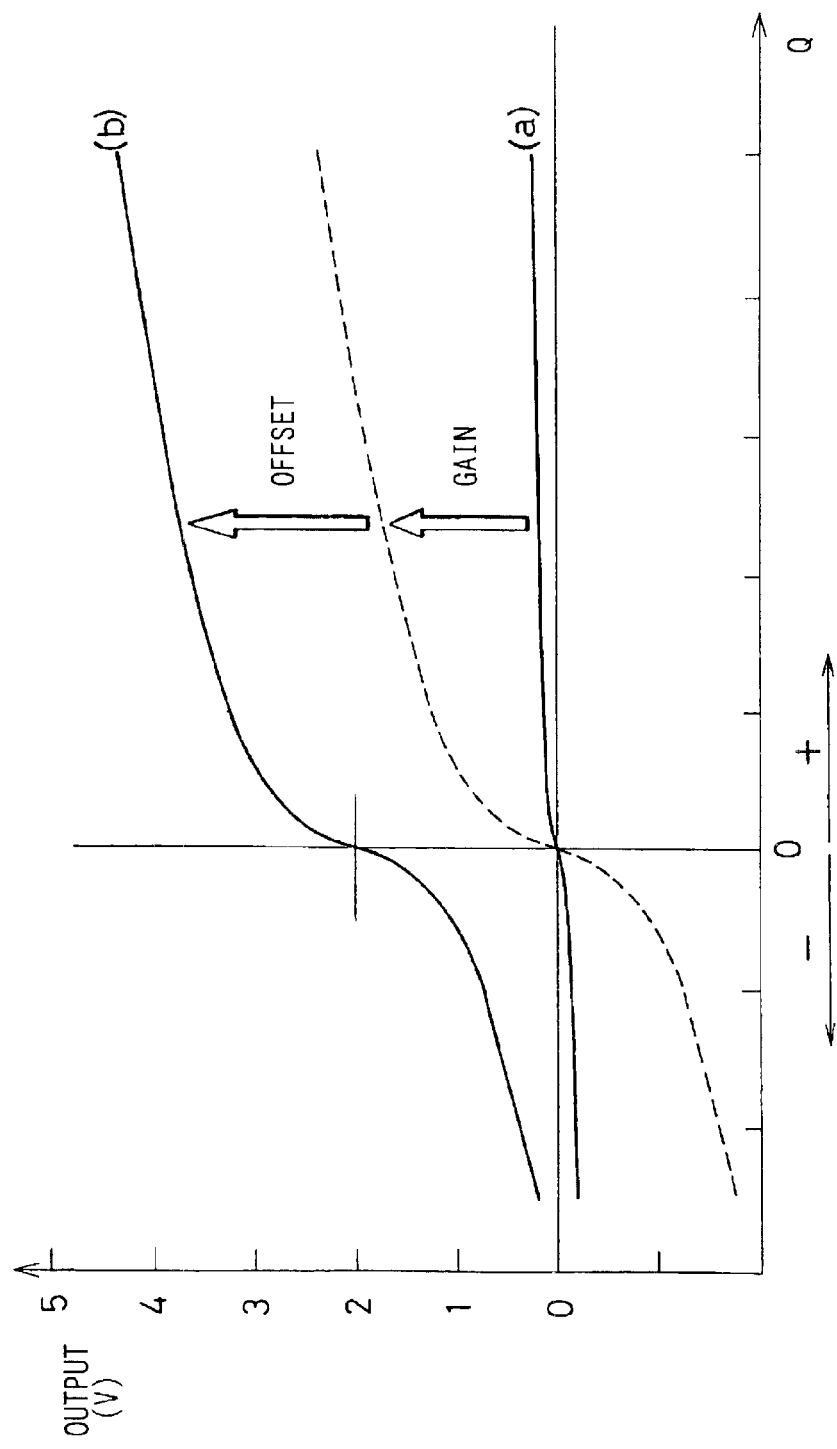
FIG. 18 is a graph showing gain and offset according to the fifth embodiment of the present invention.

The amplifier circuit AC amplifies the output of the differential amplifier circuit COP. The amplifier circuit AC performs an amplifying function based on gain and offset. FIG. 18 shows a relationship between flow amount and output voltage. The solid line (a) shows the output of the differential amplifier circuit COP. The amplifier circuit AC performs a predetermined ratio of amplification in accordance with the gain. In addition, the amplifier circuit AC performs a predetermined amount of amplification in accordance with the offset. As a result, the amplifier circuit AC obtains an output plotted by the solid line (b). An A/D converting processing (0–5(V)) in the engine control apparatus may make a bit error due to a small signal level of the output (a) of the differential amplifier COP. The output (b) of the amplifier circuit AC has sufficient magnitude available for the A/D converting processing. In addition, a dynamic range of the output from the amplifier circuit AC is designed so as to cover a practical range for actual use.

Further, it may be needed to adjust the amplitude ratio of each product due to error of resistance. Adjusting the amplitude ratio is performed by electric signal obtained from an external. For instance, a memory device 72a in the amplifier circuit AC is written with data for obtaining a predetermined amplitude ratio via an adjusting terminal 39 connected with the amplifier circuit AC. The amplifier circuit AC sets the gain and the offset based on the written data. The amplifier circuit AC has an amplifier section 72b for amplifying input signal in accordance with the gain. The amplifier circuit AC has a first offset section 72c for adding a first offset according to the detected temperature of the corrective temperature sensor 29 to the output. The amplifier circuit AC further has a second offset section 72d for adding a second offset independent from temperature to the output. Therefore, the output is applied with a total offset that is sum of the first offset and the second offset. These offset sections 72c, 72d are adjusted in accordance with data stored in the memory device 72a. As a result, the first offset, the second offset and a ratio between the first offset and the second offset are adjustable.

Figure 19:
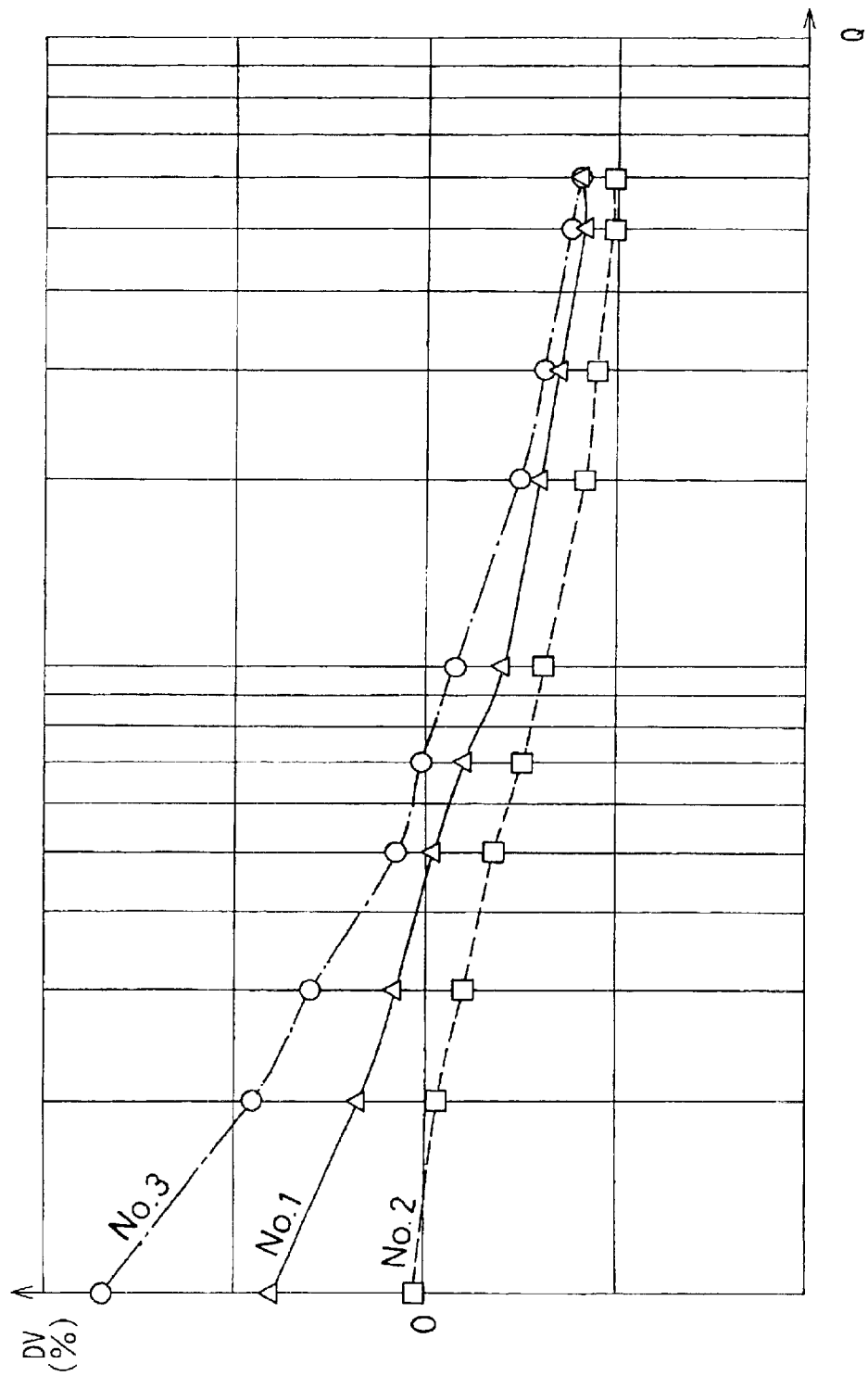
FIG. 19 is a graph showing deviation of output characteristic according to the fifth embodiment of the present invention.
Figure 22:
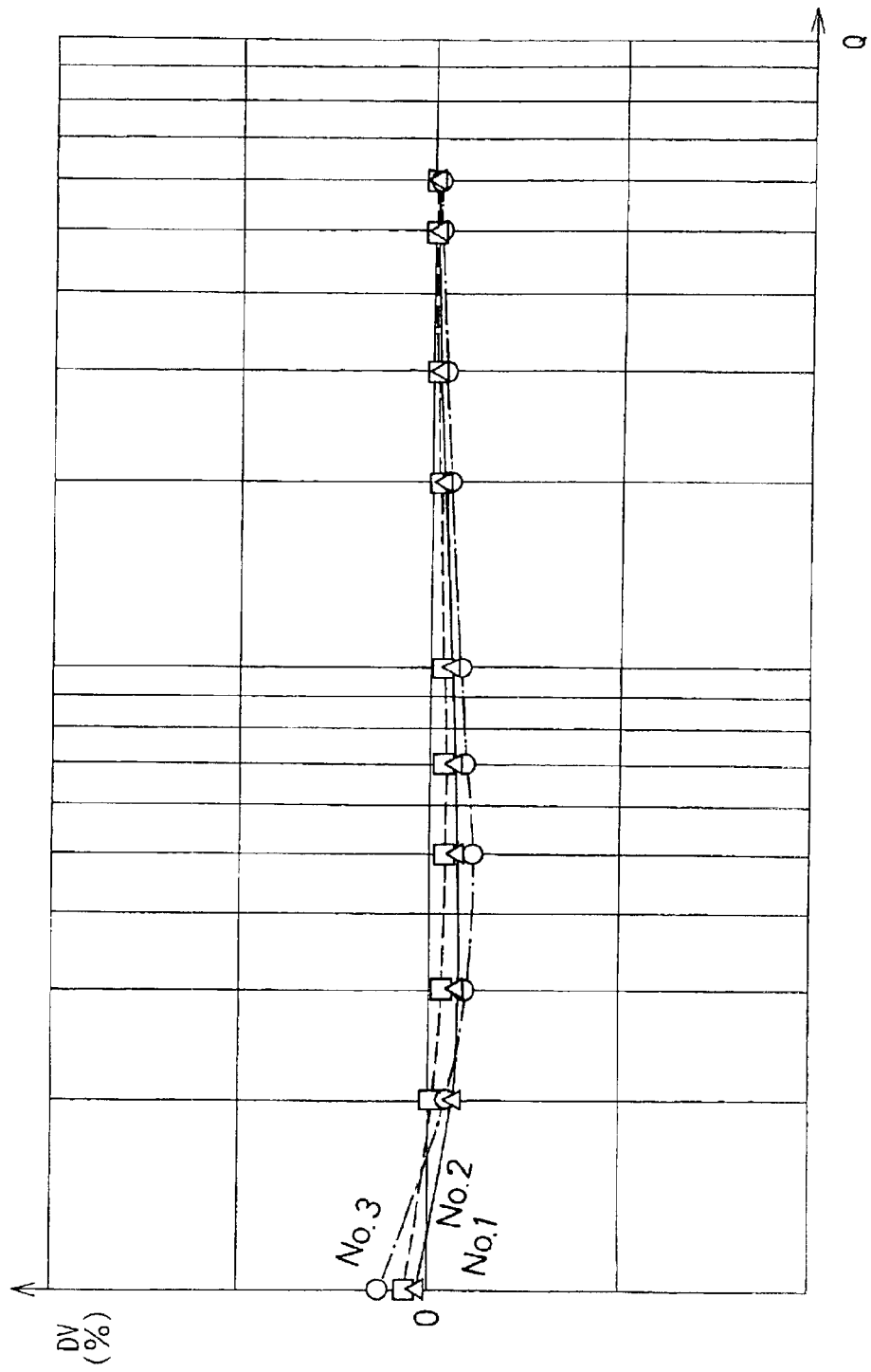
FIG. 22 is a graph showing deviation of output characteristic after an adjustment according to the fifth embodiment of the present invention.

In addition, the output characteristic relative to flow amount changes in accordance with the intake air temperature. FIG. 19 is a graph showing deviation DV (%) of the output. The deviation DV (%) is obtained relatively to a reference value that is a value of the output at 20° C. of the intake air temperature. FIG. 19 shows the deviation DV (%) of the output when the intake air temperature is 80° C. Accordingly, it is preferable to keep the deviation DV in 0. However, since the deviation DV will be produced as shown in FIG. 19, it is needed to correct it. Further, differences of the deviation DV among products are produced as shown by No. 1, No. 2, and No. 3 in FIG. 19. Accordingly, it is needed to correct temperature characteristic of each product. FIGS. 22 and 23 described later also show deviation DV (%) of the output at 80° C. where the output at 20° C. is used as the reference value.

Figure 20:
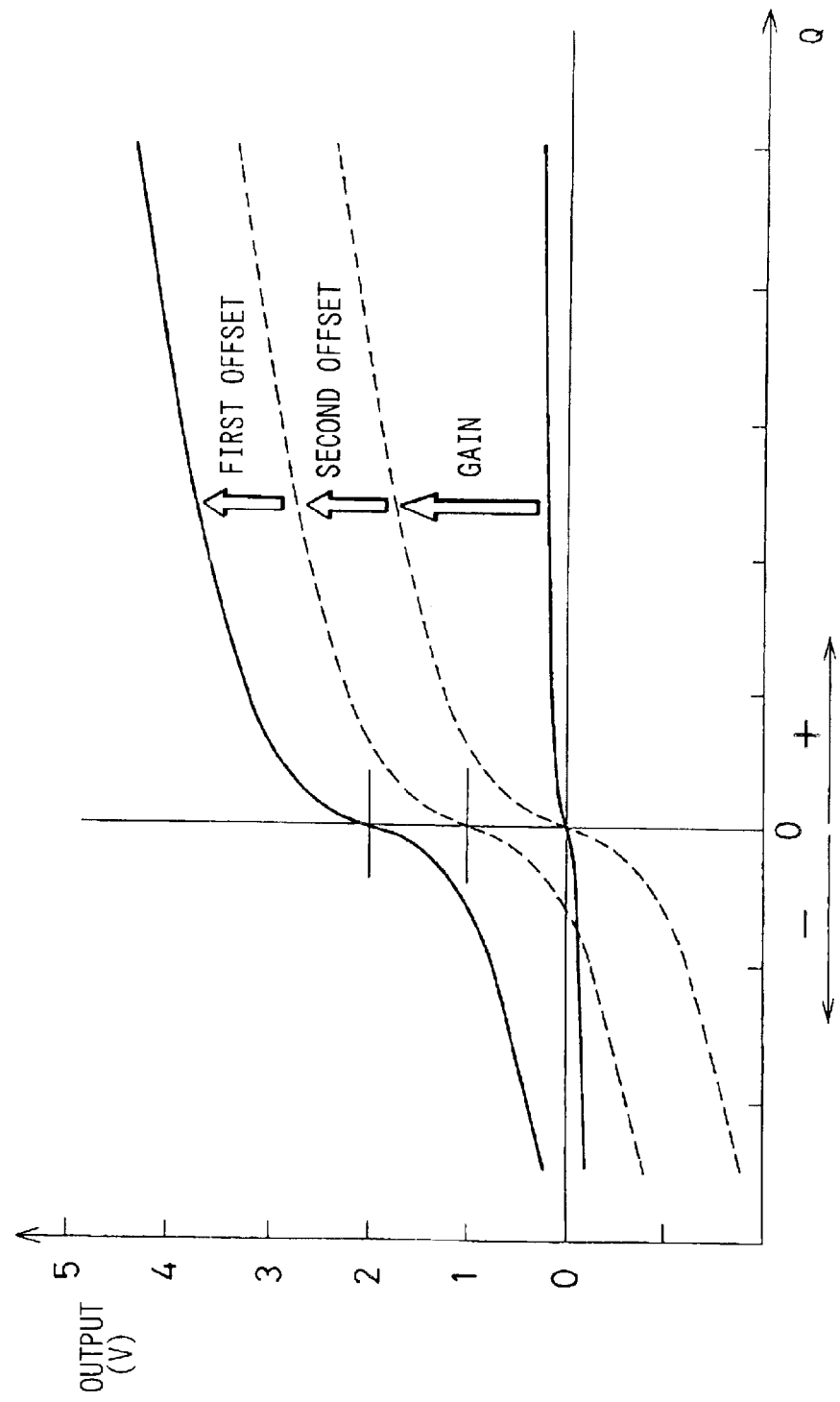
FIG. 20 is a graph showing gain and offset according to the fifth embodiment of the present invention.
Figure 21:
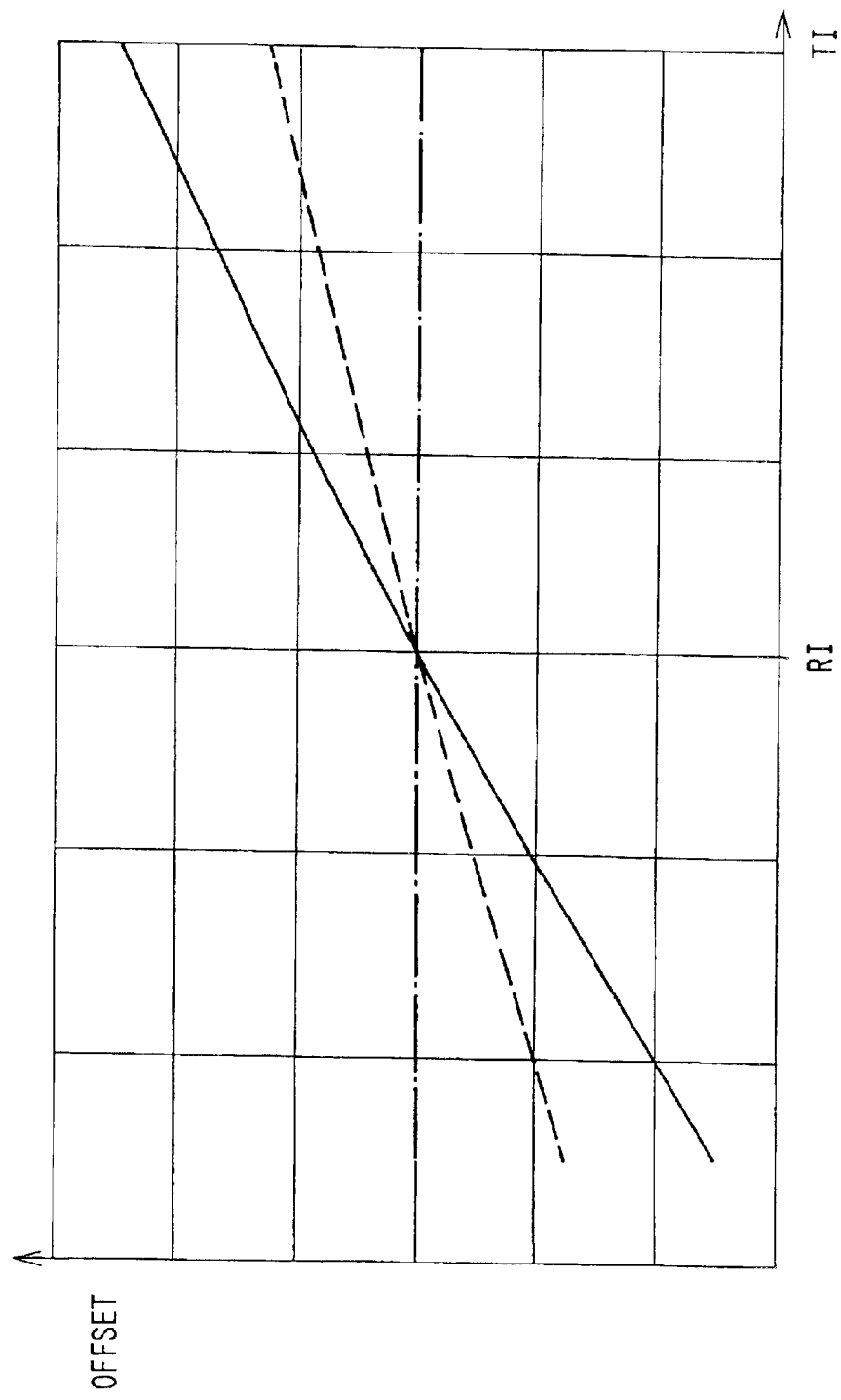
FIG. 21 is a graph showing relationship between intake air temperature and offset according to the fifth embodiment of the present invention.

In this embodiment, value of the offset is determined in the amplifier circuit AC so as to include a temperature corrective component. In addition, the entire offset is determined by adjusting a ratio of the temperature corrective component. For instance, the entire offset may be calculated by summing the first offset obtained as the temperature corrective component and the second offset obtained for components other than the temperature corrective component. As a result, the output of the amplifier circuit AC is obtained based on the first offset and the second offset as shown in FIG. 20. In addition, the ratio between the first offset and the second offset is adjusted. For example, it is possible to obtain a characteristic of offset as shown in FIG. 21. Referring to FIG. 21, the horizontal axis represents the intake air temperature TI, and the vertical axis represents the offset. RI on the horizontal axis is the reference value of the intake air temperature. The solid line shows the offset when ratio of the first offset is 100%. The broken line shows the offset when the ratio of the first offset is 50%. The chain line shows the offset when the ratio of the first offset is 0% and ratio of the second offset is 100%.

Here, a variable resistor of which resistance is varied in accordance with the intake air temperature detected by the corrective temperature sensor 29 sets the first offset. The variable resistor may be referred to as a first offset region. A constant resistor of which resistance is not varied in accordance with the intake air temperature detected by the corrective temperature sensor 29 sets the second offset. The constant resistor may be referred to as the second offset region.

A ratio between the variable resistor and the constant resistor can be changed via the adjusting terminal 39, and therefore, the ratio between the first offset and the second offset can be adjusted.

According to the structure of the embodiment, it is possible to add a temperature dependency to the amplitude ratio of the amplifier circuit AC. As a result, even if the intake air temperature changes, it is possible to reduce deviation of the output. In addition, for example, it is possible to reduce deviation substantially 0%.

Since temperature dependency ratios of the amplitude ratio of every product are adjustable, it is possible to reduce deviation among products. For example, it is possible to reduce difference among products by adjusting ratio between the first offset and the second offset. As a result, it is possible to reduce differences among the products No. 1, No. 2, and No. 3 as shown in FIG. 22. If the temperature dependency ratios of the amplitude ratio are not adjusted for every product, it becomes difficult to perform accurate flow measuring. For example, if an amplitude ratio adjusting process for the product No. 1 is applied to the other products No. 2 and No. 3 in the same manner, the deviation shown in FIG. 19 shift as shown in FIG. 23. Thus, it is impossible to remove the differences among the products.

Since the corrective temperature sensor 29 is formed on the sensor 2, it is possible to perform appropriate correction even if the intake air temperature shows transitional behavior.

The flow amount measuring apparatus according to the present invention can be utilized for applications other than the vehicular airflow meter 1. The present invention can be applied to a gas flow amount meter for measuring consumed amount of gas for fuel, an air flow amount measuring device for measuring air amount supplied for a hot-water supply device and the like.

What is claimed is:

1. A flow amount measuring apparatus comprising:
   a flow amount detecting portion disposed in a fluid passage, for detecting information indicative of flow amount of fluid flowing in the fluid passage;
   a signal generating circuit for generating voltage signal indicative of flow amount based on the information detected by the flow amount detecting portion; and
   an amplifier circuit for amplifying the voltage signal generated in the signal generating circuit by applying gain and offset, characterized in that
   the amplifier circuit includes a gain setting circuit for setting the gain, and an offset setting circuit for setting the offset,
   the offset setting circuit sets the offset as the sum of a first offset variable in accordance with fluid temperature and a second offset invariable in accordance with fluid temperature, and the offset setting circuit is constructed to enable a ratio of the first offset and the second offset to be adjusted in accordance with an externally obtained signal.

2. The flow amount measuring apparatus according to claim 1, wherein the offset setting circuit includes a resistor of which resistance varies in accordance with fluid temperature, and the first offset is set by the resistor.

3. The flow amount measuring apparatus according to claim 2, wherein the resistor is formed on the same substrate together with the flow amount detecting portion.

4. The flow amount measuring apparatus according to claim 3, wherein the resistor is located on a place which hardly receives thermal and electrical influence from the flow amount detecting portion.

5. The flow amount measuring apparatus according to claim 4, wherein the amplifier circuit includes an adjusting terminal for inputting signal for setting at least one of the gain for the gain setting circuit and the offset for the offset setting circuit.

6. The flow amount measuring apparatus according to claim 4, wherein the flow amount detecting portion comprises:

a first flow amount detecting portion for detecting information indicative of flow amount; and a second flow amount detecting portion disposed downstream the first flow amount detecting portion, for detecting information indicative of flow amount, wherein the signal generating circuit generates the signal indicative of fluid flow amount on the basis of the fluid information detected by the first flow amount detecting portion and the fluid information detected by the second flow amount detecting portion.

7. The flow amount measuring apparatus according to claim 4, wherein the flow amount detecting portion comprises:

a fluid temperature detecting resistor for detecting temperature of fluid;

a heating resistor of which temperature is controlled higher than a detected temperature of the fluid temperature detecting resistor by a predetermined temperature; and a temperature sensitive resistor of which resistance varies in accordance with temperature, disposed adjacent to the heating resistor, wherein the fluid information is outputted from the temperature sensitive resistor.

8. The flow amount measuring apparatus according to claim 3, wherein the amplifier circuit includes an adjusting terminal for inputting signal for setting at least one of the gain for the gain setting circuit and the offset for the offset setting circuit.

9. The flow amount measuring apparatus according to claim 3, wherein the flow amount detecting portion comprises:

a first flow amount detecting portion for detecting information indicative of flow amount; and a second flow amount detecting portion disposed downstream the first flow amount detecting portion, for detecting information indicative of flow amount, wherein the signal generating circuit generates the signal indicative of fluid flow amount on the basis of the fluid information detected by the first flow amount detecting portion and the fluid information detected by the second flow amount detecting portion.

10. The flow amount measuring apparatus according to claim 3, wherein the flow amount detecting portion comprises:

a fluid temperature detecting resistor for detecting temperature of fluid;

a heating resistor of which temperature is controlled higher than a detected temperature of the fluid temperature detecting resistor by a predetermined temperature; and a temperature sensitive resistor of which resistance varies in accordance with temperature, disposed adjacent to the heating resistor, wherein the fluid information is outputted from the temperature sensitive resistor.

11. The flow amount measuring apparatus according to claim 2, wherein the amplifier circuit includes an adjusting terminal for inputting signal for setting at least one of the gain for the gain setting circuit and the offset for the offset setting circuit.

12. The flow amount measuring apparatus according to claim 2, wherein the flow amount detecting portion comprises:

a first flow amount detecting portion for detecting information indicative of flow amount; and a second flow amount detecting portion disposed downstream the first flow amount detecting portion, for detecting information indicative of flow amount, wherein the signal generating circuit generates the signal indicative of fluid flow amount on the basis of the fluid information detected by the first flow amount detecting portion and the fluid information detected by the second flow amount detecting portion.

13. The flow amount measuring apparatus according to claim 2, wherein the flow amount detecting portion comprises:

a fluid temperature detecting resistor for detecting temperature of fluid;

a heating resistor of which temperature is controlled higher than a detected temperature of the fluid temperature detecting resistor by a predetermined temperature; and a temperature sensitive resistor of which resistance varies in accordance with temperature, disposed adjacent to the heating resistor, wherein the fluid information is outputted from the temperature sensitive resistor.

14. The flow amount measuring apparatus according to claim 1, wherein the amplifier circuit includes an adjusting terminal for inputting signal for setting at least one of the gain for the gain setting circuit and the offset for the offset setting circuit.

15. The flow amount measuring apparatus according to claim 14, wherein the flow amount detecting portion comprises:

a first flow amount detecting portion for detecting information indicative of flow amount; and a second flow amount detecting portion disposed downstream the first flow amount detecting portion, for detecting information indicative of flow amount, wherein the signal generating circuit generates the signal indicative of fluid flow amount on the basis of the fluid information detected by the first flow amount detecting portion and the fluid information detected by the second flow amount detecting portion.

16. The flow amount measuring apparatus according to claim 14, wherein the flow amount detecting portion comprises:

a fluid temperature detecting resistor for detecting temperature of fluid;

a heating resistor of which temperature is controlled higher than a detected temperature of the fluid temperature detecting resistor by a predetermined temperature; and a temperature sensitive resistor of which resistance varies in accordance with temperature, disposed adjacent to the heating resistor, wherein the fluid information is outputted from the temperature sensitive resistor.

17. The flow amount measuring apparatus according to claim 1, wherein the flow amount detecting portion comprises:

a first flow amount detecting portion for detecting information indicative of flow amount; and a second flow amount detecting portion disposed downstream the first flow amount detecting portion, for detecting information indicative of flow amount, wherein the signal generating circuit generates the signal indicative of fluid flow amount on the basis of the fluid information detected by the first flow amount detecting portion and the fluid information detected by the second flow amount detecting portion.

18. The flow amount measuring apparatus according to claim 1, wherein the flow amount detecting portion comprises:

a fluid temperature detecting resistor for detecting temperature of fluid;

a heating resistor of which temperature is controlled higher than a detected temperature of the fluid temperature detecting resistor by a predetermined temperature; and a temperature sensitive resistor of which resistance varies in accordance with temperature, disposed adjacent to the heating resistor, wherein the fluid information is outputted from the temperature sensitive resistor.

* * * * *